Patented July 10, 1934

1,966,026

UNITED STATES PATENT OFFICE 1,966,026

PROCESS OF PRODUCING 8-HYDROXY-QUINOLINE

Friedrich Boedecker, Dahlem, near Berlin, Germany

No Drawing. Application February 26, 1932, Serial No. 595,435. In Germany March 11, 1931

6 Claims. (Cl. 260—38)

In the practice 8-hydroxyquinoline was hitherto produced by melting 8-quinoline sulfonic acid with alkali. To this process however many drawbacks adhere. When the 8-quinoline sulfonic acid is produced from quinoline the obtained product is not uniform, because the sulfonic group not only enters the 8-position, but also the 5-position. After the treatment with alkali therefore a product is obtained which besides 8-hydroxyquinoline also contains 5-hydroxyquinoline. The last named compound is however a valueless substance which must be separated from the 8-hydroxyquinoline through a special treatment. Another drawback of the known process is, that troublesome secondary reactions take place when the sulfonic group and the hydroxyl group are exchanged, so that an unsatisfactory yield is obtained.

It has now been discovered, that 8-hydroxyquinoline can be produced with much better results by starting with 8-chloroquinoline or chloroquinoline sulfonic acid. When 8-chloroquinoline is produced no isomer is obtained which contains the substituent to be exchanged for the hydroxyl group in other positions than in the 8-position. This is of course very advantageous. The chloroquinoline is converted into a sulfonic acid in known manner. It is hereby of no consequence for the final result of the process in which position the substitution by the sulfonic group takes place. The chloroquinoline sulfonic acid, which contains the sulpho acid group in the 4-position and which also may be obtained by treating 1-chloro-2-amino-benzene-sulfonic acid with glycerine and sulphuric acid in the presence of a mild oxidation agent (for instance nitrobenzol) after the Skraup method, is treated with saponifying agents, whereby the technically important 8-hydroxyquinoline sulfonic acid is produced. From this acid finally the 8-hydroxyquinoline is obtained by eliminating the sulfonic group.

The saponifying of the chlorine (in order to obtain the hydroxyl group) as well as the elimination of the sulfonic group takes place at relatively low temperatures, whereby an excellent yield is obtained. The chloroquinoline sulfonic acid is saponified already at 150° C. When a concentrated solution is used the treatment may be carried out without employing any raised pressure. When a diluted solution is used the treatment takes place in an autoclave and in this case the usual excess of alkali is not needed. Instead of saponifying the sulfonic acid proper the salts of this acid may be saponified, for instance the calcium salt obtained at the separation of the acid. The sulfonic group splits off extraordinarily readily. When splitting off the sulfonic group it is not necessary to proceed in the usual manner and for instance to heat the product with diluted acids or alkalis, since the group may be easily split off simply by heating in water up to about 180° C. After this treatment and subsequent neutralization an excellent yield of hydroxyquinoline is obtained. This hydroxyquinoline is already pure and therefore no further treatment is needed.

Through this novel process therefore the technically valuable 8-hydroxyquinoline is made easily obtainable and also 8-hydroxyquinoline sulfonic acid may according to the invention be produced by a simple and inexpensive treatment. Hitherto 8-hydroxyquinoline sulfonic acid was produced from 8-hydroxyquinoline, which is a very expensive starting material.

Example 1

100 parts of chloroquinoline are heated together with 250 parts of concentrated sulphuric acid and 250 parts of fuming sulphuric acid (70%) to 140° C. for about an hour. If after this treatment a test is made with alkali the obtained fluid will no more be turbid. The reaction mixture is mixed with about 1000 parts of water, and after the cooling the separated 8-chloro-quinoline-5-sulfonic acid is sucked off. A yield of 120 parts is obtained. By super-saturating the sulphuric acid with lime, removing the gypsum formed and evaporating the remaining liquor the rest of the acid may be obtained in the form of a lime salt, so that the total yield of chloroquinoline sulfonic acid is almost equal to the theoretical yield.

92,2 parts of the obtained 8-chloroquinoline sulfonic acid, 400 parts of caustic soda and 100 parts of water are heated together in an open vessel at a temperature of 200–205° C. for about 15 minutes. The reaction mixture is poured into water and acidified whereby the hydroxyquinoline sulfonic acid is precipitated.

(The treatment with caustic soda may also be performed in the following modified manner: 139 parts of 8-chloroquinoline sulfonic acid, 113 parts of caustic soda and 270 parts of water are heated together in an autoclave at 150–160° C. for about 8 hours under simultaneous stirring. After the reaction mixture has cooled, has been acidulated and the acid has separated out this acid is purified by recrystallization or reprecipitation, whereupon 116 parts of pure hydroxyquinoline sulfonic acid are obtained.)

17,3 parts of hydroxyquinoline sulfonic acid are treated with 50 parts of water in an autoclave at a temperature of 180° C. for about 5 hours. The solution is filtered and neutralized whereby 10,5 parts of hydroxyquinoline are obtained in the form of a white crystal powder solidifying at 75°. Almost the theoretical yield is obtained.

If it is desired to use 2-chlorine-1-aminobenzene-5-sulfonic acid as starting material the process may for instance be carried out in the following manner:

*Example 2*

40,8 parts of 2-chlorine-1-aminobenzene-5-sulfonic acid, 60 parts of glycerine, 60 parts of sulphuric acid and 12 g. of nitrobenzene are brought together and cautiously heated to about 130° C. Between 130° C. and 140° C. the reaction commences, the reaction mixture takes up a darkish brown color and the temperature rises to 150–155° C. without application of heat from the outside. After the reaction has ceased a temperature of 140–145° C, is maintained for about 3 hours, whereupon water is added. The unconverted or unchanged nitrobenzene is removed by means of steam and the acid solution is filtered in hot state. During the cooling of the solution the chloroquinoline sulfonic acid crystallizes. An additional amount of sulfonic acid may be obtained by treating the mother-liquor with lime.

I claim:

1. A process of producing 8-hydroxyquinoline, comprising the steps of treating 8-chloroquinoline sulfonic acid with alkali under application of heat and separating the obtained hydroxyquinoline sulfonic acid from the reaction mixture.

2. A process of producing 8-hydroxyquinoline, comprising the steps of treating 8-chloroquinoline sulfonic acid with alkali under application of heat, separating the hydroxyquinoline sulfonic acid formed from the reaction mixture and splitting off the sulfonic group from this acid.

3. A process of producing 8-hydroxyquinoline, comprising the steps of treating 8-chloroquinoline sulfonic acid with alkali under application of heat, separating the hydroxyquinoline sulfonic acid formed from the reaction mixture, heating such acid together with water to elevated temperatures and separating the hydroxyquinoline formed from the resulting solution.

4. A process of producing 8-hydroxyquinoline, comprising the steps of treating 8-chloroquinoline sulfonic acid with alkali under application of heat, separating the hydroxyquinoline sulfonic acid formed from the reaction mixture, heating such acid together with water to a temperature of about 180° C. and separating the hydroxyquinoline formed from the resulting solution.

5. A process of producing 8-hydroxyquinoline, comprising the step of treating 8-hydroxyquinoline sulfonic acid with water at elevated temperatures.

6. A process of producing 8-hydroxyquinoline, comprising the step of treating 8-hydroxyquinoline sulfonic acid with water at a temperature of about 180° C.

FRIEDRICH BOEDECKER.